Nov. 6, 1928.

W. H. APPLEBY

STEAM HOT PLATE

Original Filed June 25, 1921

Re. 17,123

INVENTOR

William H. Appleby

BY

R. S. A. Dougherty.

ATTORNEY

Reissued Nov. 6, 1928. Re. 17,123

UNITED STATES PATENT OFFICE.

WILLIAM H. APPLEBY, OF BALTIMORE, MARYLAND, ASSIGNOR TO BETHLEHEM STEEL COMPANY, OF BETHLEHEM, PENNSYLVANIA, A CORPORATION OF PENNSYLVANIA.

STEAM HOT PLATE.

Original No. 1,490,721, dated April 15, 1924, Serial No. 480,427, filed June 25, 1921. Division of reissue application No. 97,477, filed March 25, 1926. Application for reissue filed August 11, 1927, Serial No. 212,325, Reissue Patent No. 16,953, dated May 1, 1928. Division B. This application for reissue filed July 27, 1928. Serial No. 295,833.

The present invention is a divisional application of my co-pending reissue application, Serial No. 97,477, filed March 25, 1926.

My invention relates to plates used in presses acting on plastic material which requires heating or cooling during the operation. It embodies a novel plate structure having advantages over those ordinarily used and a novel method of forming it. It is well known that in the manufacture of celluloid sheets, rubber blankets and analogous articles of plastic material, the material is pressed between plates and for novel convenience and economy in operation the presses usually embody a series of parallel plates which are simultaneously pressed together with layers of material between them. The capacity of the press, therefore, depends largely upon the thickness of the plates used, and difficulty has been encountered in making them of the desired thinness on account of the necessity for providing circulating means in them for a heating fluid such as steam or a cooling fluid such as water.

It is the object of my invention to provide a plate which is strong in structure and having circuitous passageways formed therein for circulating the heating or cooling medium therethrough. The novel features of my invention will be more fully understood from the following description and claims taken with the drawings, in which:

Figure 1:
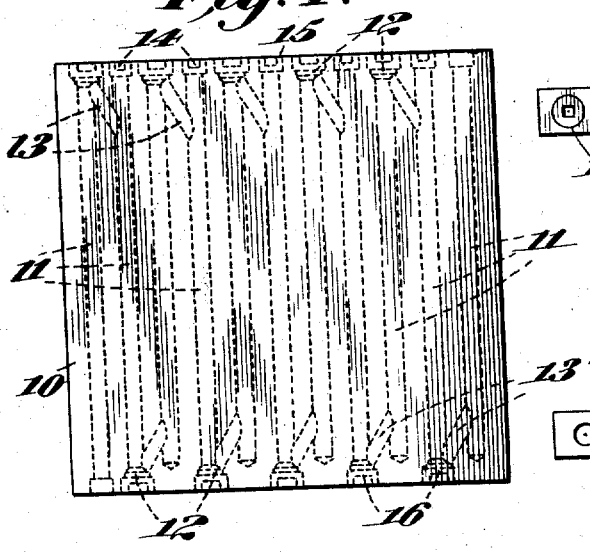
Fig. 1 is a plan view of the plate with the fluid passageway shown in dotted lines.
Figure 2:
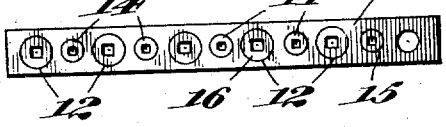
Fig. 2 is an end view of the plate on one of the marginal lines.
Figure 3:
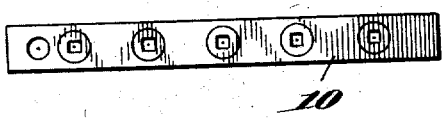
Fig. 3 is a similar view to Fig. 1 showing the marginal edge opposite to that shown in Fig. 2.
Figure 4:
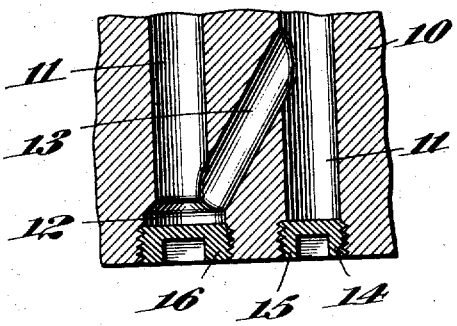
Fig. 4 is an enlarged section through the ends of two adjacent ducts and connecting passageway at the marginal edge shown in Fig. 2.
Figure 5:
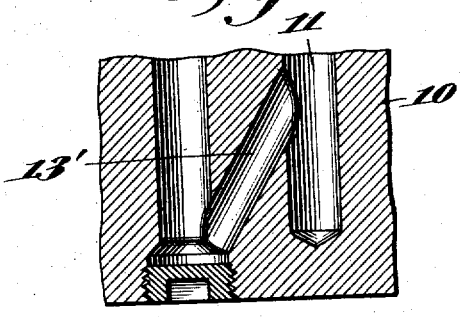
Fig. 5 is an enlarged section through the ends of two adjacent ducts and connecting passageway at the marginal edge shown in Fig. 3.

Referring to the drawings, 10 designates a steel plate preferably formed by rolling and is rectangular in outline and of uniform thickness sufficient to have therein a passageway of desired size for fluid. To provide for circulating fluid through the plate, a series of similar cylindrical parallel ducts 11 are then drilled through the plate from and at right angles to the marginal edge. These ducts are of such size and cross section as compared to the thickness of the plate as will leave sufficient thickness of metal at that line to properly distribute and conduct heat from or to them. These separate ducts must be connected together at alternate ends in series to form a continuous passageway for the circulation. The ducts are connected by drilling an enlarged recess 12 in the opening of each alternate duct at right angles to the marginal edge of the plate and then drilling through the bottom of this recess 12 a passageway 13 at an angle to the margin and leading into the adjacent duct near the end. It will be noted in Fig. 1 that one of each pair of adjacent ducts is drilled entirely through the plate and the other duct of the pair is drilled from a marginal edge of the plate and terminate short of the opposite end, except the duct at the end of the series which is drilled entirely through the plate in order to provide an open end to connect with a source of fluid supply. The open ducts at their ends opposite to the recess 12 are recessed and threaded, as at 14, to receive a closing plug 15. The recess 12 is threaded to receive a closing plug 16. It will be noted that the recess 12 is materially greater than the diameter of the passageway, so as to permit the proper entry of the drill at an angle to form the passageways 13 and 13′. Where an uneven number of ducts 11 are formed, the one at the end at one side of the plate and the other at the end of the series at the opposite side of the plate may remain open so as to connect with a source of fluid supply to cause the fluid to travel through the plate in succession. This permits the fluid supply to have its entrance at one side of the plate and the discharge on the other side. When the number of ducts formed in the plate are of even number then the ducts at each end of the plate may remain open so as to connect with a source of fluid supply at the same marginal edge of the plate. The ends of the ducts which remain open may be threaded to receive and engage the ends of the supply and discharge pipes, not shown. It will be seen that by this arrangement of passageways in the plate, the heating and cooling fluid will pass in a tortuous passage through the plate evenly giving off or absorbing heat between the points at which the fluid supply is connected to the plate and that there are no joints likely to become loose under the stresses of contraction and expansion.

While I have shown my invention in but one form, it will be obvious to those skilled in the art that it is not so limited but is susceptible of various other changes and modifications without departing from the spirit thereof, and I desire, therefore that only such limitations shall be placed thereupon as are imposed by the prior art or as are specifically set forth in the appended claims.

Having thus described the invention what I claim as new and desire to secure by Letters Patent is:

1. A hot plate for presses comprising a metallic plate having two ducts drilled therein, one end of one of said ducts being enlarged to provide a socket, a cross passageway drilled from the bottom of this socket at an angle to the ducts, to the second duct, and closure means for the mouth of the socket.

2. A heating platen comprising a thin-walled metal plate having parallel cross passages in relatively close arrangement with certain of said passages extending to at least one edge of the platen and short diagonal passages connecting pairs of said cross passages and extending only from a point where one of said pairs of cross passages open through the edge of the platen to an adjacent cross passage, in combination with means for closing the open ends of said cross passages.

WILLIAM H. APPLEBY.